US009344705B2

(12) United States Patent
Oggier et al.

(10) Patent No.: US 9,344,705 B2
(45) Date of Patent: May 17, 2016

(54) TIME OF FLIGHT CAMERA WITH RECTANGULAR FIELD OF ILLUMINATION

(71) Applicant: Heptagon Micro Optics Pte. Ltd., Zurich (CH)

(72) Inventors: Thierry Oggier, Zurich (CH); Michael Richter, Zufikon (CH)

(73) Assignee: Heptagon Micro Optics Pte. Ltd., Singapore (SG)

(*) Notice: Subject to any disclaimer, the term of this patent is extended or adjusted under 35 U.S.C. 154(b) by 0 days.

(21) Appl. No.: 14/316,871

(22) Filed: Jun. 27, 2014

(65) Prior Publication Data

US 2014/0307061 A1   Oct. 16, 2014

Related U.S. Application Data

(63) Continuation of application No. 12/837,859, filed on Jul. 16, 2010, now Pat. No. 8,803,967.

(60) Provisional application No. 61/230,239, filed on Jul. 31, 2009.

(51) Int. Cl.
| | | |
|---|---|---|
| *H04N 13/02* | (2006.01) | |
| *G01S 7/481* | (2006.01) | |
| *G02B 19/00* | (2006.01) | |
| *G02B 5/09* | (2006.01) | |

(Continued)

(52) U.S. Cl.
CPC .......... *H04N 13/0203* (2013.01); *G01S 7/4814* (2013.01); *G02B 5/09* (2013.01); *G02B 19/0019* (2013.01); *G02B 19/0052* (2013.01); *G02B 19/0061* (2013.01); *H04N 5/2256* (2013.01); *G01S 17/936* (2013.01)

(58) Field of Classification Search
CPC . G01S 7/4814; G01S 17/936; G02B 19/0019; G02B 19/0061; G02B 5/09; G02B 19/0052; H04N 13/0203; H04N 5/2256
USPC .................................................. 348/135, 49
See application file for complete search history.

(56) References Cited

U.S. PATENT DOCUMENTS

| | | |
|---|---|---|
| 3,598,984 A | 8/1971 | Slomski |
| 5,793,527 A | 8/1998 | Nalwa |
| 7,268,858 B2 | 9/2007 | Kuijk et al. |

(Continued)

FOREIGN PATENT DOCUMENTS

| | | |
|---|---|---|
| EP | 0046253 A1 | 2/1982 |
| EP | 1300712 A2 | 4/2003 |

OTHER PUBLICATIONS

Acharya et al., "System Design of Time-of-Flight Range Camera for Car Park Assist and Backup Application", CVPR workshop, 2008.

(Continued)

*Primary Examiner* — Jay Patel
*Assistant Examiner* — Francis G Geroleo
(74) *Attorney, Agent, or Firm* — Fish & Richardson P.C.

(57) ABSTRACT

Improved field-of-illumination (FOI) and field-of-view (FOV) matching for 3D time-of-flight cameras is provided using light emitters with rectangular reflectors. A better adjustment of the FOI with the camera's FOV has the following advantages: optimal use of emitted light and reduced multi-path problems. Furthermore, embodiments bring the benefit for rather low-cost customization of the illumination to match the FOI to the specified FOV.

8 Claims, 9 Drawing Sheets

(51) Int. Cl.
*H04N 5/225* (2006.01)
*G01S 17/93* (2006.01)

(56) References Cited

U.S. PATENT DOCUMENTS

| | | |
|---|---|---|
| 7,355,648 B1 | 4/2008 | Braun et al. |
| 7,717,343 B2 | 5/2010 | Havens et al. |
| 2003/0068078 A1 | 4/2003 | Swab |
| 2004/0061871 A1 | 4/2004 | Knighton et al. |
| 2005/0138852 A1 | 6/2005 | Yamauchi |
| 2007/0176192 A1 | 8/2007 | Leatherdale et al. |
| 2008/0074755 A1 | 3/2008 | Smith |
| 2009/0097248 A1 | 4/2009 | Tsao et al. |
| 2009/0140050 A1 | 6/2009 | Liu et al. |

OTHER PUBLICATIONS

Möller et al. "Robust 3D Measurement with PMD", Sensors 1st range imaging research day, Eidgenössische Technische Hochschule Zürich, 2005.

Oggier, T., et al., "An all solid-state optical range camera for 3D real-time imaging with sub-centimeter depth resolution (SwissRangerTM)", Proceedings of SPIE, pp. 534-545, vol. 5249, The International Society for Optical Engineering, 2004.

Oggier, T., et al., "SwissRanger SR3000 and First Experiences Based on Miniaturized 3D-TOF Cameras," 1st Range Imaging Research Day, ETH Zurich, 2005, 12 pages.

Ringbeck, Thorsten, et al., "A 3D Time of Flight Camera for Object Detection," retrieved from the internet: URL: http://www.ifm.com/obj/O1D_Paper-PMD.pdf; 10 pp., Jul. 12, 2007.

European Search Report dated Mar. 9, 2012, from counterpart European Application No. EP 10171432.7, filed on Jul. 30, 2010.

TIME OF FLIGHT CAMERA WITH RECTANGULAR FIELD OF ILLUMINATION

RELATED APPLICATIONS

This application is a Continuation of U.S. application Ser. No. 12/837,859 filed on Jul. 16, 2010, which claims the benefit under 35 USC 119(e) of U.S. Provisional Application No. 61/230,239, filed on Jul. 31, 2009, both of which are incorporated herein by reference in their entirety.

BACKGROUND OF THE INVENTION

Current commercially available three-dimensional (3D) time of flight (TOF) cameras use in general an array of light emitting diodes (LEDs) with micro-lenses that more or less have a similar field of illumination (FOI) as the field of view (FOV) covered by the camera. Laser-based 3D TOF cameras also require a specific micro-optical design to generate a FOI that matches to the FOV of the camera.

LEDs are commercially available as surface-mount devices. They can be ordered either without any micro-lens or with micro-lens. A micro-lens is required for narrower emission angles. With respect of 3D sensing, such devices have two main drawbacks:

In general, the emission field has circular shape. On the other side, the imaged area on the image sensor, which determines together with the lens the FOV, corresponds to a rectangular-shaped area, or a square-like area distorted by the lens to form a barrel, pincushion distortion.

The commercial availability of different emission angles is limited. In order to get a good match of FOI and FOV, expensive custom-made light source micro-optics have to be developed.

Figure 1:
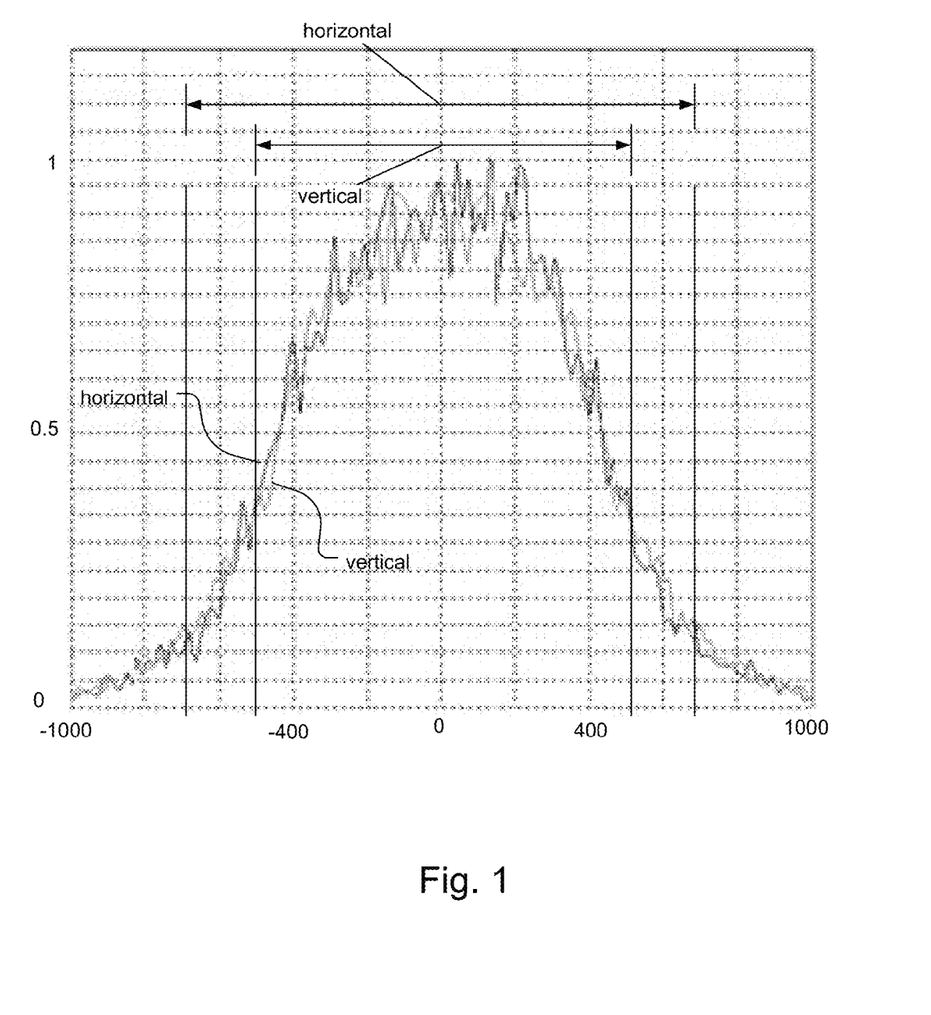
FIG. 1 is a plot of irradiance (W/sq meter) as a function of position in millimeters for a standard LED source.
Figure 2:
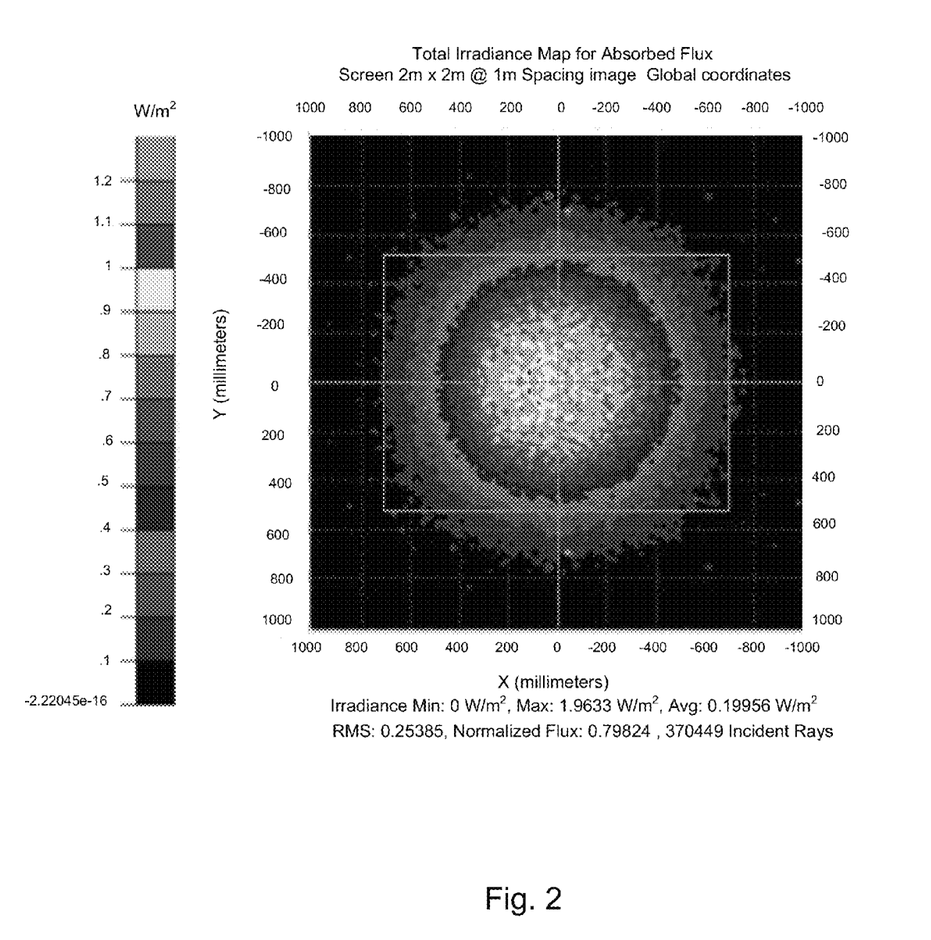
FIG. 2 is an irradiance map in millimeters showing the field of illumination relative to the field of view.

A typical FOI pattern is shown in the simulation in FIGS. 1 and 2. They show the intensity distribution on a 2×2 m (meter) target at a distance of 1 m from the LED light source. The two pairs of lines indicate the FOV of this specific camera in the horizontal and vertical directions in FIG. 1. In FIG. 2, the rectangle shows the FOV. Especially in the corners, FOV is not well illuminated while illumination power is wasted above and below the FOV.

Narrow FOI has the advantage that most of the emitted light gets onto the FOV. However, the uniformity over the area gets lost. Usually, the light power in the center of the FOV is larger than the power at the corners. On the other side, a wide FOI shows an improved uniformity over the entire FOV, but a lot of power is wasted outside the FOV.

Other problems can arise when the FOI is wider than a FOV. It might happen that objects outside the FOV reflect modulated light onto objects in the FOV. In such a case, the receiver gets a resulting image from the direct path and the indirect path. Not only does this potentially disturb the actual range measurement of the object in the FOV, it also cannot be detected because the reflecting object is outside the FOV and cannot be seen by the camera.

SUMMARY OF THE INVENTION

Because the commercial availability of different emission angles is limited and in most cases they do not fit the specifications of the camera's FOV, one has to start designing customized optics for the illumination. However, customizing a micro-optical design is costly and in most cases not practical in an economical sense. For that reason, most 3D camera manufacturer use non-optimized micro-optics on the light sources.

The invention proposes the implementation of a light source in combination with a reflector. The reflector is designed such that light is deflected in a way that the FOI best covers the camera's FOV. The reflector preferably has rectangular-like shape, since the FOV in general is rectangular-shaped due to the rectangular image sensor.

In general, according to one aspect, the invention features, a time of flight camera, comprising: a time of flight detector chip for detecting light from a scene, a light emitter for producing modulated light for illuminating the scene, and a frusto pyramidal reflector for directing light from the light emitter onto the scene.

In embodiments, the light emitter is a light emitting diode or a laser diode. The frusto pyramidal reflector is metal coated and has a rectangular or square cross-section. Usually, the frusto pyramidal reflector is formed in the front cover.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 3:
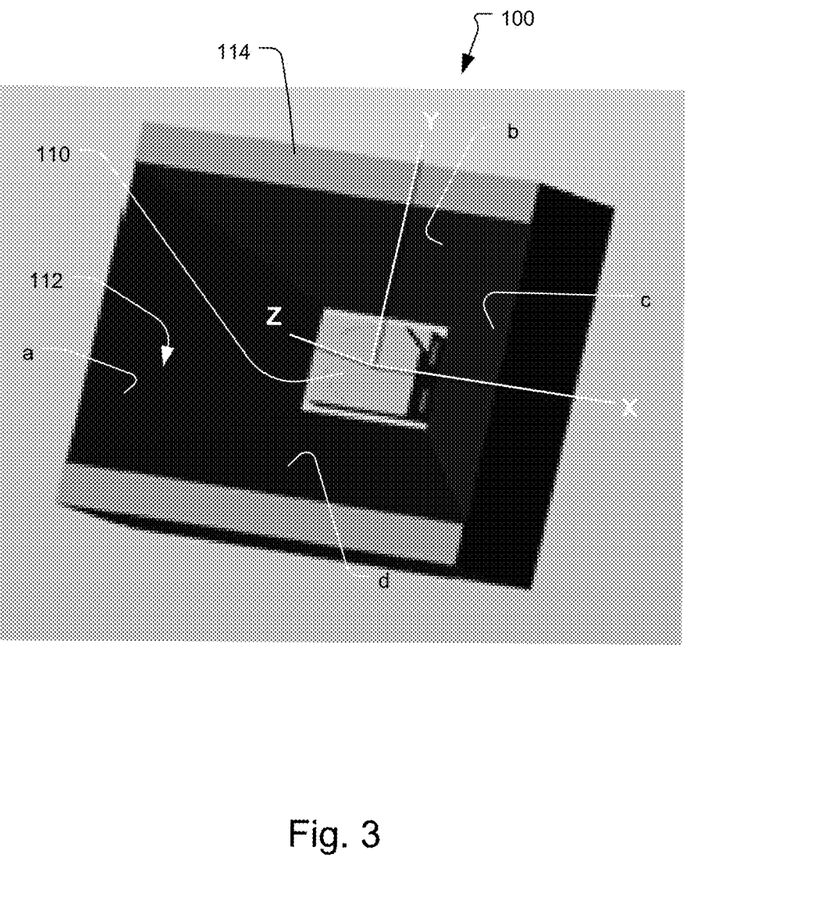
FIG. 3 is a perspective view of a light source according to the present invention.

FIG. 3 shows a light source 100 for a TOF camera according to the principles of the present invention.

A light emitter 110 is positioned in a rectangular reflector 112 that is formed in a frame 114.

In the current embodiment, the light emitter 110 is an LED or laser diode. The reflector 112 comprises four angled triangular surfaces a, b, c, d of the substrate 114 that angle in obliquely toward the light emitter 110 to form a frusto pyramidal cut-out in the substrate 114. In this embodiment, the reflector 112 has a rectangular cross section. In the preferred embodiment, the surfaces a, b, c, d of the frusto pyramidal reflector 112 are coated to be reflective such as with a metal coating to direct light from the light emitter onto a scene of interest.

Figure 4:
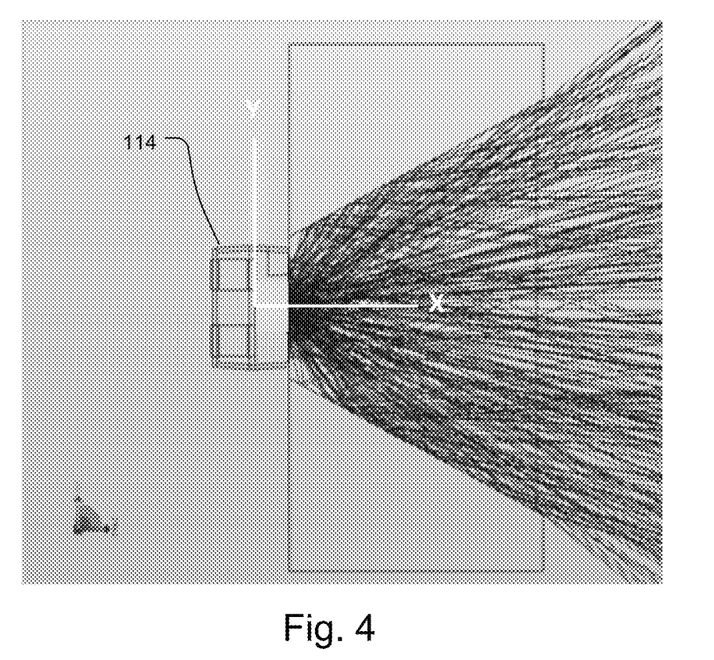
FIG. 4 is a Monte Carlo simulation of the light emitted from the light source.

FIG. 4 is cross section of a ray tracing using the example of an LED light emitter 110 with the square-shaped reflector 112 formed in the substrate 114.

Figure 5:
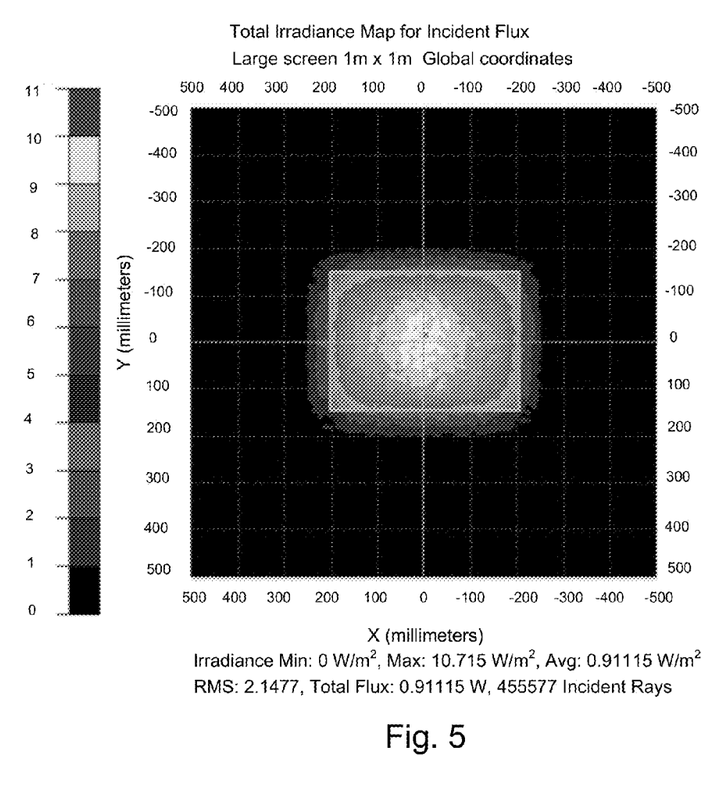
FIG. 5 is an irradiance map in millimeters showing the field of illumination relative to the field of view for the inventive light source.
Figure 6:
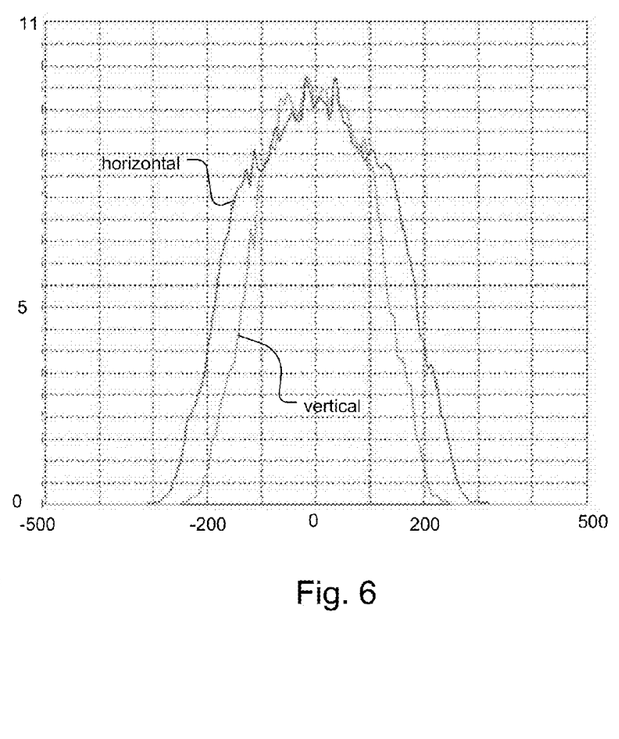
FIG. 6 is a plot of irradiance (W/sq meter) as a function of position in millimeters for the inventive LED source.

FIGS. 5 and 6 show a simulation of the far field intensity pattern for an LED light source. The rectangle in FIG. 5 shows the FOV.

In addition to the above-mentioned benefits, the preferred embodiment provides higher flexibility in adapting the FOI to different applications/specifications. Specially designed micro lenses are not required. Instead, only the angles of the frusto pyramidal reflector 112 need to be adapted to the FOV.

Figure 7:
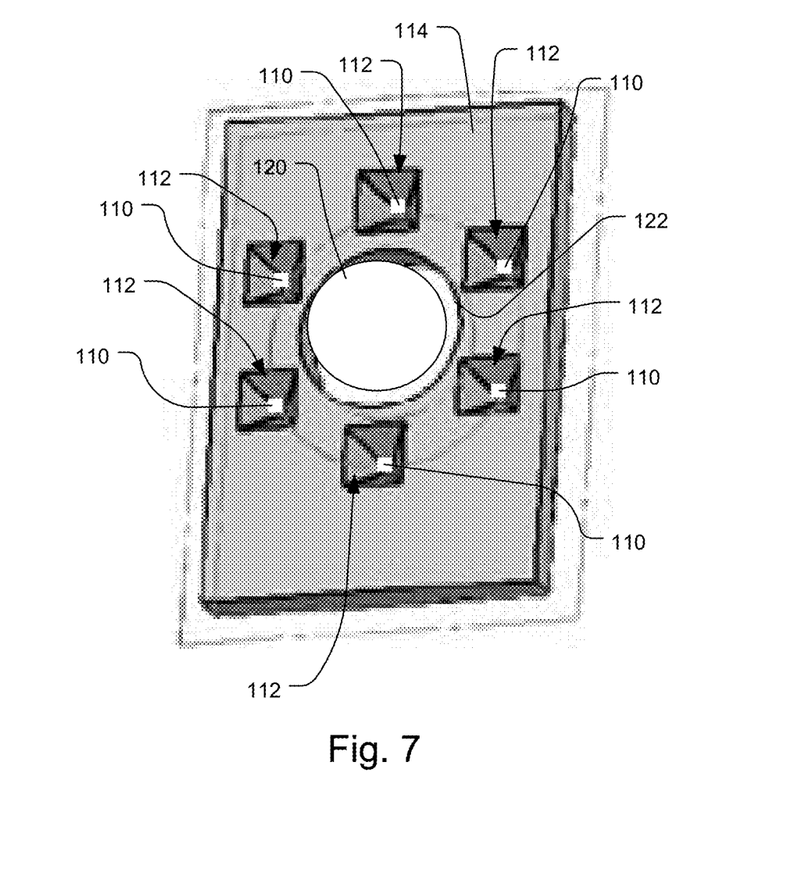
FIG. 7 shows a time of flight camera with the inventive light sources.

FIG. 7 shows a 3D TOF camera. The substrate 114 that forms the front cover of the camera and comprises 6 frusto pyramidal reflectors 112 formed in the surface of the substrate 114. In this embodiment, the reflectors 112 have a square cross section. At the bottom of each reflector 112, a light emitter 110 is located. A center port 112 is formed in the substrate 114. The front aperture 120 is located in the port 122 to collect light returning from the scene of interest and focus the light onto a TOF detector chip.

In later designs, the FOI can easily be modified by simply replacing the reflector plate substrate 114 with one having different reflectors. The reflector surfaces are preferably metal coated to be mirror-like.

Figure 8:
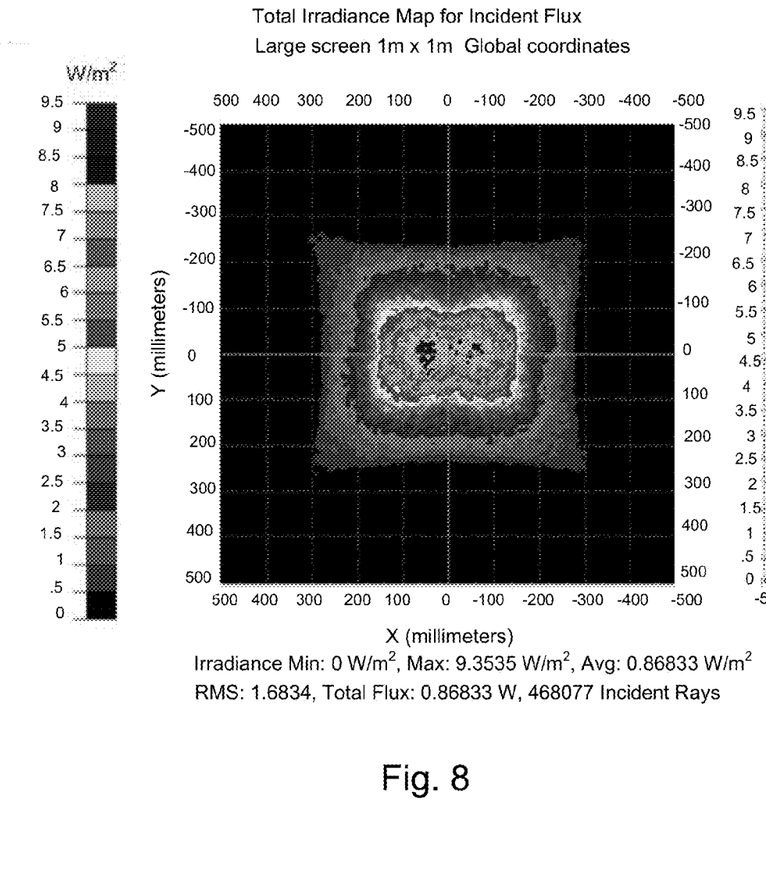
FIG. 8 is an irradiance map in millimeters showing the field of illumination relative to the field of view for another embodiment of the inventive light source.
Figure 9:
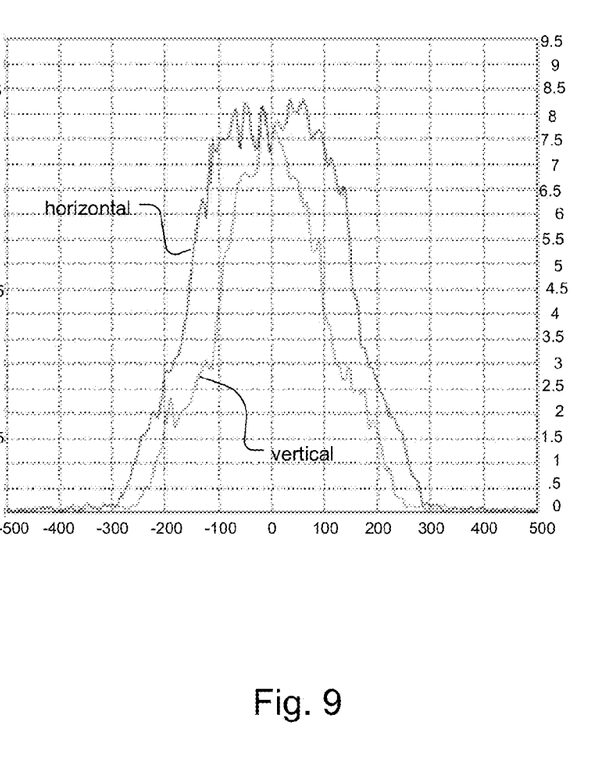
FIG. 9 is a plot of irradiance (W/sq meter) as a function of position in millimeters for the embodiment of the LED source.

FIGS. 8 and 9 show a simulation of the far field intensity pattern for an LED light source showing a pincushion projection of the emitted light using a reflector-type. This design of a reflector takes into account the distorted FOV of the camera.

Figure 10:
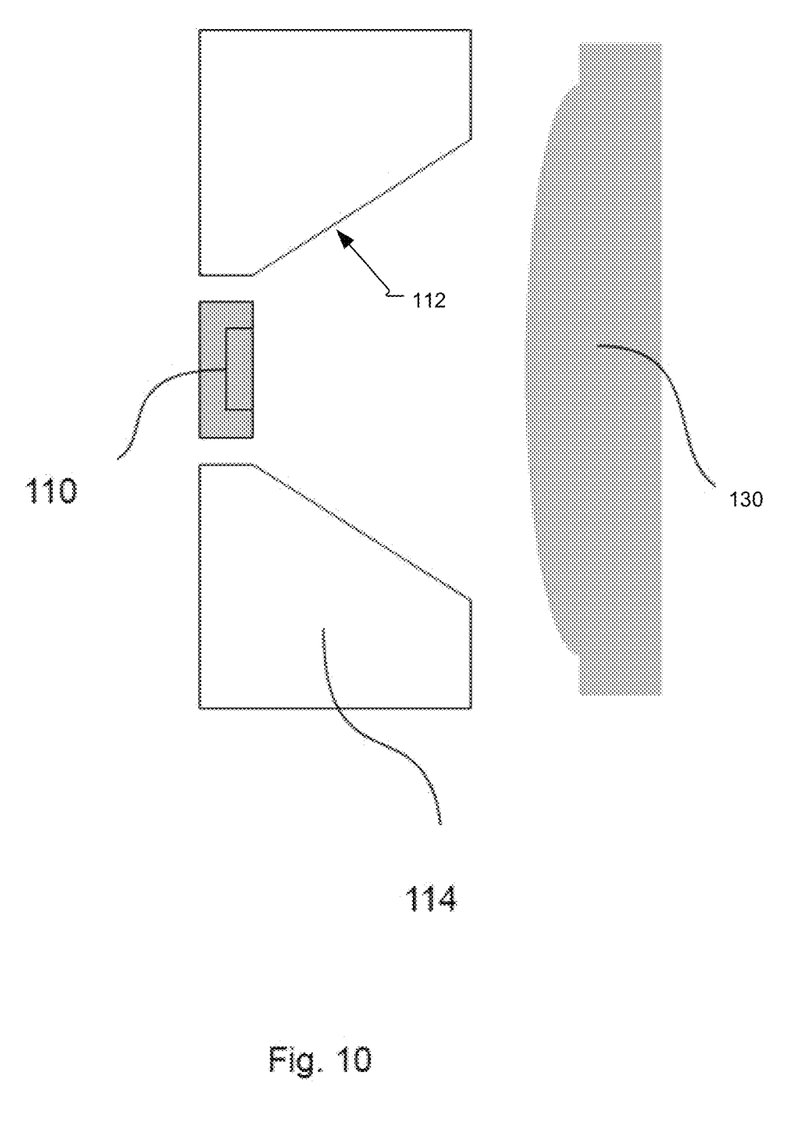
FIG. 10 shows an embodiment based on the invention with an additional optical element set on top.

FIG. 10 illustrates another possible embodiment of using the same reflector approach as illustrated in FIGS. 3 and 4 but adding another optical element, lens, 130 that further adjusts the FOI to the requirements.

Figure 11:
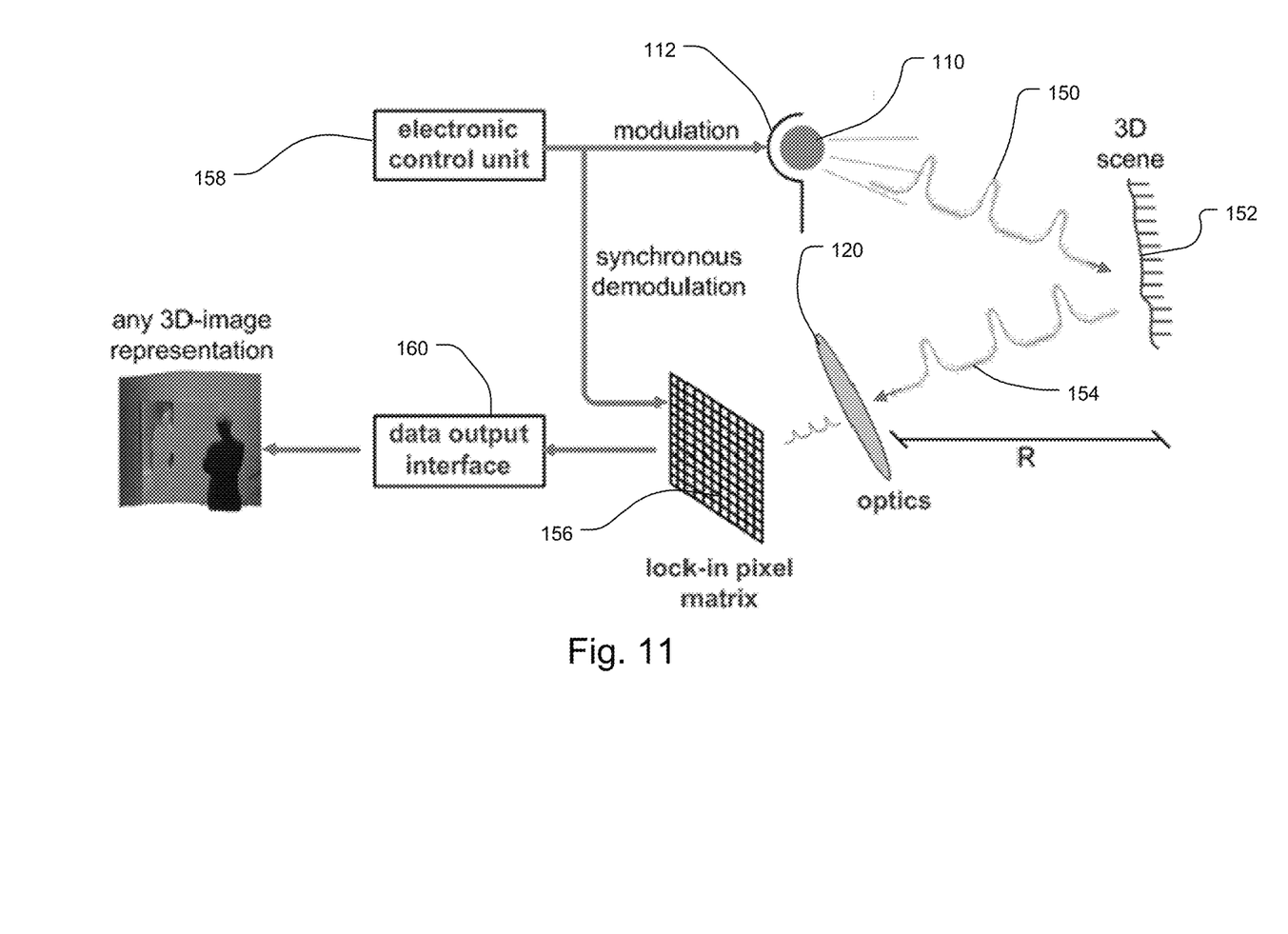
FIG. 11 is a schematic illustration showing the operation of a TOF camera.

FIG. 11 shows the typical application of a 3D TOF camera. For these cameras, LED-type light emitters as light sources are disclosed in T. Oggier et al., "An all solid-state optical range camera for 3D real-time imaging with sub-centimeter resolution (SwissRanger™)", Proc. SPIE Vol. 5249 No. 65, 2003 and T. Oggier et al., "SwissRanger SR3000 and first experiences based on miniaturized 3D-TOF Cameras", 1st range imaging research day, Eidgenössische Technische Hochschule Zürich, 2005 or laser diodes light emitters as disclosed in Acharya et al. "System Design of Time-of-Flight Range Camera for Car Park Assist and Backup Application", CVPR workshop, 2008.

In more detail, the light emitter 110 produces modulated light 150 that is directed at the 3-D scene 152 by the rectangular frusto pyramidal reflector 112. The returning light 154 from the scene 152 is collected by the camera lens 120, which includes a bandpass filter so that only light at the wavelength emitted by the light emitter 110 is transmitted. An image is formed on the TOF detector chip 156 which is a two dimensional array of pixels. Control electronics 158 coordinate the modulation of the light emitter 110 with the sampling of the TOF detector chip 156. This results in synchronous demodulation. A data output interface 160 is then able to reconstruct the 3-D image representation using the samples generated by the chip 156 such that a range to the scene is produced for each of the pixels of the chip 156.

Laser diodes have the advantage of possibly higher optical power per device, while LEDs are commercially available in surface mount technology and, in most cases, can be ordered with micro-lenses on top to for a given emission angle.

The invention presented herein gives the following advantages:

It renders a better matching of the field of illumination (FOI) of the light source and the field of view (FOV) of the lens/camera.

The complexity and cost to change the FOI of an existing design is significantly reduced.

Undetectable multi-path artifacts from objects outside the FOV are reduced.

While this invention has been particularly shown and described with references to preferred embodiments thereof, it will be understood by those skilled in the art that various changes in form and details may be made therein without departing from the scope of the invention encompassed by the appended claims.

What is claimed is:

1. A time of flight camera, comprising:
    a substrate;
    one or more frustum shaped reflectors formed in a surface of the substrate, wherein each reflector includes a center port;
    a respective light emitter located at a bottom of each reflector in the center port for producing light for illuminating a scene; and
    an image sensor for detecting light from the scene;
    wherein each reflector is arranged to direct light from the light emitter at the bottom of the reflector onto the scene so that a field of illumination substantially matches a field of view of the image sensor and light power at a periphery of the field of view is substantially the same as light power at a center of the field of view.

2. The camera as claimed in claim 1, wherein each light emitter is a light emitting diode.

3. The camera as claimed in claim 1, wherein each light emitter is a laser diode.

4. The camera as claimed in claim 1, wherein each reflector is metal coated.

5. The camera as claimed in claim 1, wherein each reflector has a rectangular cross-section.

6. The camera as claimed in claim 1, wherein the image sensor includes an array of pixels that demodulate light returning from the scene synchronously with modulation of the light emitter.

7. The camera as claimed in claim 1, further comprising a front cover, each reflector being formed in the front cover.

8. The camera as claimed in claim 1, further comprising optical elements to shape the field of illumination.

* * * * *